United States Patent
Renner

(10) Patent No.: US 11,824,253 B2
(45) Date of Patent: Nov. 21, 2023

(54) TRANSMITTER DEVICE

(71) Applicant: HUSQVARNA AB, Huskvarna (SE)

(72) Inventor: Thomas Renner, Ulm (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/801,367

(22) PCT Filed: Nov. 16, 2020

(86) PCT No.: PCT/EP2020/082247
§ 371 (c)(1),
(2) Date: Aug. 22, 2022

(87) PCT Pub. No.: WO2021/175466
PCT Pub. Date: Sep. 10, 2021

(65) Prior Publication Data
US 2022/0412942 A1    Dec. 29, 2022

(30) Foreign Application Priority Data
Mar. 2, 2020 (EP) .................................... 20160427

(51) Int. Cl.
*H01Q 1/22*      (2006.01)
*G08C 17/02*      (2006.01)

(52) U.S. Cl.
CPC ............... *H01Q 1/22* (2013.01); *G08C 17/02* (2013.01)

(58) Field of Classification Search
CPC ................................... H01Q 1/22; G08C 17/02
See application file for complete search history.

(56) References Cited

U.S. PATENT DOCUMENTS

| 9,007,050 B2 * | 4/2015 | Hill ..................... G01N 33/246 |
| | | 324/696 |
| 10,524,430 B1 * | 1/2020 | Nervino ............... A01G 25/167 |

(Continued)

FOREIGN PATENT DOCUMENTS

| CH | 622899 A5 * | 4/1994 |
| CN | 201745999 U | 2/2011 |

(Continued)

OTHER PUBLICATIONS

International Search Report and Written Opinion of PCT/EP2020/082247, dated Feb. 8, 2021, all pages cited in its entirety.

*Primary Examiner* — Jamel E Williams
(74) *Attorney, Agent, or Firm* — BURR & FORMAN LLP

(57) ABSTRACT

A transmitter device (100) includes a housing (102). The transmitter device (100) has at least one battery housed within the housing (102). The transmitter device (100) has a cover (104) which at least partially covers the at least one battery. The transmitter device (100) further includes a sensor (106) electrically coupled with the at least one battery. The transmitter device (100) is installed in a ground surface. The transmitter device (100) is characterized in that the cover (104) is removably coupled with the housing (102) by a snap-fit connection such that the cover (104) is vertically accessible for removal while the transmitter device (100) remains installed. The cover (104) includes one or more recesses or protrusions (114) and the housing (102) has one or more complementary protrusions (112) or recesses for the removable coupling between the cover (104) and the housing (102), and the cover (104) includes a tab (108) or a slot which allows disassembly of the cover (104) from the housing (102). The housing (102) includes one or more integral ribs.

10 Claims, 5 Drawing Sheets

(56) References Cited

U.S. PATENT DOCUMENTS

| | | | | |
|---|---|---|---|---|
| 2012/0217243 | A1* | 8/2012 | Cohen | B65D 83/384 |
| | | | | 222/183 |
| 2015/0201570 | A1* | 7/2015 | Lin | A01G 25/167 |
| | | | | 137/1 |
| 2015/0276454 | A1* | 10/2015 | Laursen | G01D 4/02 |
| | | | | 73/201 |
| 2016/0061762 | A1* | 3/2016 | Buss | G01N 27/223 |
| | | | | 172/1 |
| 2017/0290534 | A1* | 10/2017 | Antonio | A61B 5/0022 |
| 2018/0102655 | A1* | 4/2018 | Miller | F21L 4/08 |
| 2020/0054123 | A1* | 2/2020 | Franklin | A46B 17/08 |

FOREIGN PATENT DOCUMENTS

| | | | | | |
|---|---|---|---|---|---|
| CN | 102506941 | A | * | 6/2012 | |
| CN | 203148876 | U | * | 8/2013 | |
| CN | 203840108 | U | | 9/2014 | |
| CN | 104884910 | A | | 9/2015 | |
| CN | 105069857 | A | | 11/2015 | |
| CN | 205251334 | U | | 5/2016 | |
| CN | 107651159 | A | | 2/2018 | |
| CN | 207335132 | U | * | 5/2018 | |
| CN | 108991687 | A | * | 12/2018 | |
| CN | 208536940 | U | | 2/2019 | |
| CN | 208705479 | U | * | 4/2019 | |
| CN | 209215373 | U | | 8/2019 | |
| CN | 209694789 | U | | 11/2019 | |
| CN | 210447791 | U | * | 5/2020 | |
| DE | 29709421 | U1 | | 7/1997 | |
| DE | 102012024000 | A1 | * | 6/2014 | ........... A61B 5/1121 |
| EP | 3220793 | B1 | | 4/2019 | |
| EP | 3637009 | A1 | | 4/2020 | |
| WO | 2012123877 | A1 | | 9/2012 | |

\* cited by examiner

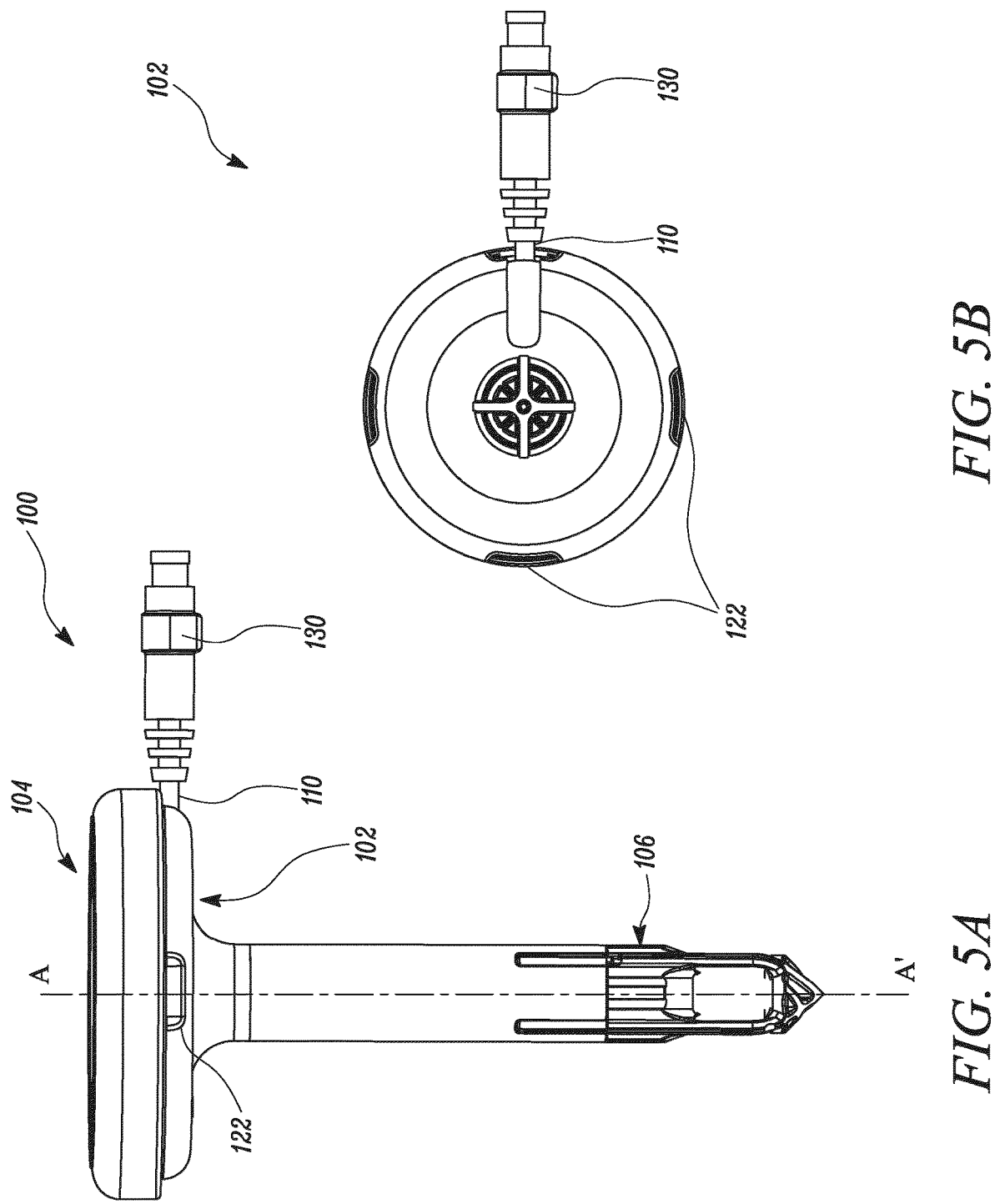

TRANSMITTER DEVICE

TECHNICAL FIELD

The present disclosure relates to a transmitter device. More specifically, the present disclosure relates to a transmitter device which provides ease of accessibility to components within the transmitter device with minimum disturbance involved therewith.

BACKGROUND

The transmitter device may be used indoors or outdoors. For example, battery-powered soil moisture sensors, which may be used in the lawn due to their flat design. Further, the battery-powered soil moisture sensors may have a battery compartment. Additionally, or alternatively, cable-based soil moisture sensors may provide certain implementation benefits with use of a cable for powering, or data communication purposes. In case the transmitter device is electronically arranged to also act as a transceiver device it includes both a transmitter and a receiver. In this case the transmitter and receiver may be combined and share common circuitry or a single housing.

There may be instances where working with the soil moisture sensors may become a troublesome process. Different parts of the soil moisture sensors may be sealed watertight with one or more screws. Generally, tools such as screwdriver, plier and the like may be required to undo the screws in order to change different parts within the sensors, more particularly battery, antenna, and the like. Moreover, the screws of the battery compartment may be located on the lower side of the soil moisture sensors.

An example of a transmitter device in irrigation application is provided by U.S. Pat. No. 10,524,430 (hereinafter referred to as '430 reference). The '430 reference provides sensor device, formed in a simple and relatively low cost construction using PVC pipe components in an embodiment. The cap can be connected to the base by screw threads, or simply by a close fit, with the two components tightly held together in waterproof relationship. The sensor device has a pair of contacts for sensing the presence of water, and these can be a bottom prong that anchors the device in the ground, as one contact, and a second contact at a selected height for activating the electronics of the device when water reaches the level of that contact. An antenna can extend out the top of the cap, or an internal antenna can be used. However, the '430 reference seems short of providing an arrangement which provides integral strength and-resilience from external forces to the sensor. Further, the sensor may face potential damage to crucial components such as the pipe components, from the external forces such as movement of ground mowers over the sensor. The '430 reference seems silent on any arrangement or means to address such external forces from the ground mowers (or even other devices or personnel) to avoid any undesired damage to the sensor.

Thus, there is a need for improved transmitter device which provides a simple and user-friendly process for accessing inside the transmitter device. Further, the improved transmitter device is required to check any undesired damage due to any external force.

SUMMARY

In view of the above, it is an objective of the present invention to solve or at least reduce the drawbacks discussed above. The objective is at least partially achieved by a transmitter device. The transmitter device includes a housing. At least one battery is housed within the housing. The transmitter device further includes a cover. The cover at least partially covers the at least one battery. Moreover, the transmitter device has a sensor. The sensor is electrically coupled with the at least one battery. The transmitter device is installed in a ground surface. The transmitter device is characterized in that the cover is removably coupled with the housing by a snap-fit connection such that the cover is vertically accessible for removal while the transmitter device remains installed. The cover includes one or more recesses or protrusions, and the housing has one or more complementary protrusions or recesses for the removable coupling between the cover and the housing. And, the cover includes a tab or a slot which allows disassembly of the cover from the housing. Further, the housing includes one or more integral ribs extending towards the cover. Thus, the present disclosure provides simple, convenient, and tool-free access within the transmitter device, based on the vertical accessibility of the cover. Further, the one or more integral ribs allow improved transfer of any external force (say from ground mowers) from the cover to the housing.

According to an embodiment of the present invention, the one or more complementary protrusions or recesses are provided circumferentially integrally on an internal surface of the cover and on an external surface of the housing. This may provide better engagement of the cover with the housing. This may further prevent penetration of dirt particles and other foreign intrusions inside the housing.

According to an embodiment of the present invention, the one or more complementary protrusions or recesses on the cover and the housing leads to a water-tight sealing therebetween. This may prevent liquid entry inside the housing of the transmitter device.

According to an embodiment of the present invention, the cover is disassembled by a pulling action to detach the cover from the housing. This may prevent need of additional accessories and/or tools to detach the cover from the housing.

According to an embodiment of the present invention, the cover and the housing include one or more seals therebetween. This may provide desired water-tight capability and prevent liquid entry inside the housing of the transmitter device.

According to an embodiment of the present invention, the housing includes the one or more integral ribs which at least partially contact the. cover, when the cover is assembled with the housing. The ribs may provide enhanced strength to the housing of the transmitter device, particularly from vertical loads (such as lawn movers) acting on the housing.

According to an embodiment of the present invention, the housing includes an antenna housed therein. This may help to communicate with any external device such as robotic mower, user device (laptop, smartphone etc.) and the like.

According to an embodiment of the present invention, the antenna is at least partially covered by the cover. Presence of the top cover protects the transmitter device from external agents (say dust, moisture) while extending working life of the transmitter device.

According to an embodiment of the present invention, the transmitter device may measure at least one parameter associated with surrounding environment of the sensor. The transmitter device may then transmit the measured parameter to any connected device such as robotic mower, user device (laptop, smartphone etc.) and the like.

According to an embodiment of the present invention, the transmitter device is a soil sensor. The transmitter device of the present disclosure may be readily implemented with any sensor, particularly sensors used in outside (garden) applications, such as the soil sensor.

According to an embodiment of eh present invention the transmitter device is electronically arranged to act as a transceiver device. This allows additional use cases, as with this embodiment the thus realized transceiver device is also able to receive data from a remote location and thus can be remotely controlled.

Other features and aspects of this invention will be apparent from the following description and the accompanying drawings.

BRIEF DESCRIPTION OF THE DRAWINGS

The invention will be described in more detail with reference to the enclosed drawings, wherein:

FIG. 5A shows a side view of the transmitter device, in accordance with another embodiment of the present invention; and FIG. 5B shows a view from bottom of the transmitter device, in accordance with an embodiment of the present invention.

DESCRIPTION OF EMBODIMENTS

Figure 1:
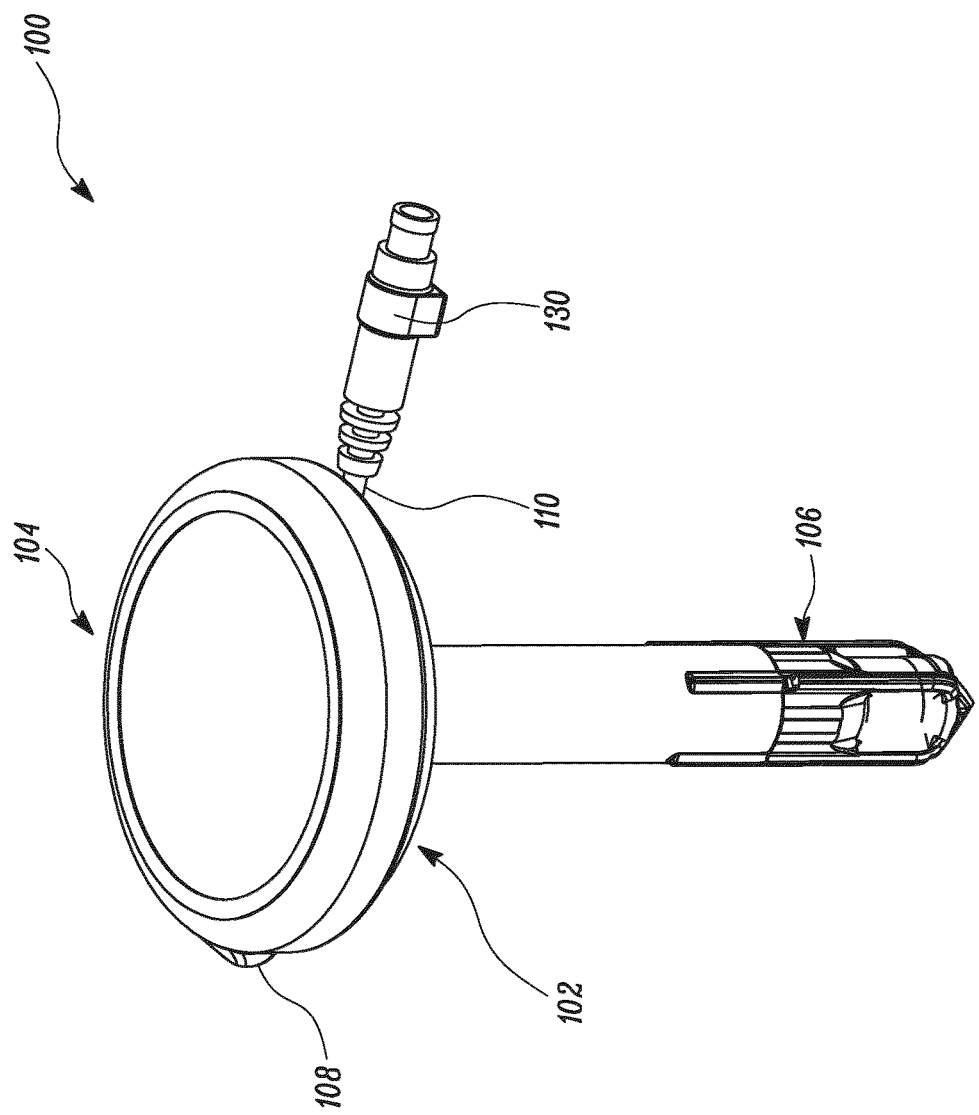
FIG. 1 shows a perspective view of a transmitter device along with some important parts thereof, in accordance with an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

FIG. 1 illustrates a transmitter device 100 along with some important parts of the transmitter device 100. The transmitter device 100 finds applications in outdoor environments such as gardens, lawns and the like where monitoring of ground/soil/environment factors (say temperature, humidity, solar radiation) is required. The transmitter device 100 of the present disclosure may be readily implemented with any sensor, particularly sensors used in outside (garden) applications, such as the soil sensor. The transmitter device 100 may measure at least one parameter associated with surrounding environment of a sensor 106. The transmitter device 100 may then transmit the measured parameter to any connected device such as robotic mower, user device (laptop, smartphone etc.) and the like.

The transmitter device 100 includes a housing 102. At least one battery (not shown) is housed within the housing 102. The present disclosure illustrates a cable-based transmitter device 100. The transmitter device 100 further includes a cover 104. Further, the cover 104 at least partially covers the at least one battery, or other components within the housing 102. The cover 104 has a tab 108. The tab 108 may help to remove the cover 104 from the housing 102 of the transmitter device 100. The cover 104 is removably coupled with the housing 102 while the transmitter device 100 remains installed in any surface such as a ground surface.

The cover 104 may be removed to gain access within the housing 102 and work with different components of the transmitter device 100, such as the battery. The transmitter device 100 further has a cable 110. The cable 110 may connect the transmitter device 100 with a socket 130. Moreover, the sensor 106 is electrically coupled with the at least one battery.

In some embodiments, the cover 104 with or without the tab 108 may be manufactured by three-dimensional printing process. A user may be provided with a data file having pre-stored instructions to print the cover 104 using a three-dimensional (3-D) printer. In order to do so, the cover 104 may be presented in digital format. Use of three-dimensional printing (alternatively, 3D printing) may provide versatility of using different materials along with lower lead-time in manufacturing and design of the cover 104.

In some embodiments, the cover 104 and the tab 108 may be made up of a material selected from steel, brass, stainless steel, aluminum or plastic. Nature of the material is chosen as per the requirements of the common user. The desired nature of the material provides the cover 104 with certain characteristic features such as flexibility, elasticity, rigidity, heat or vibrations resistant properties.

Figure 2:
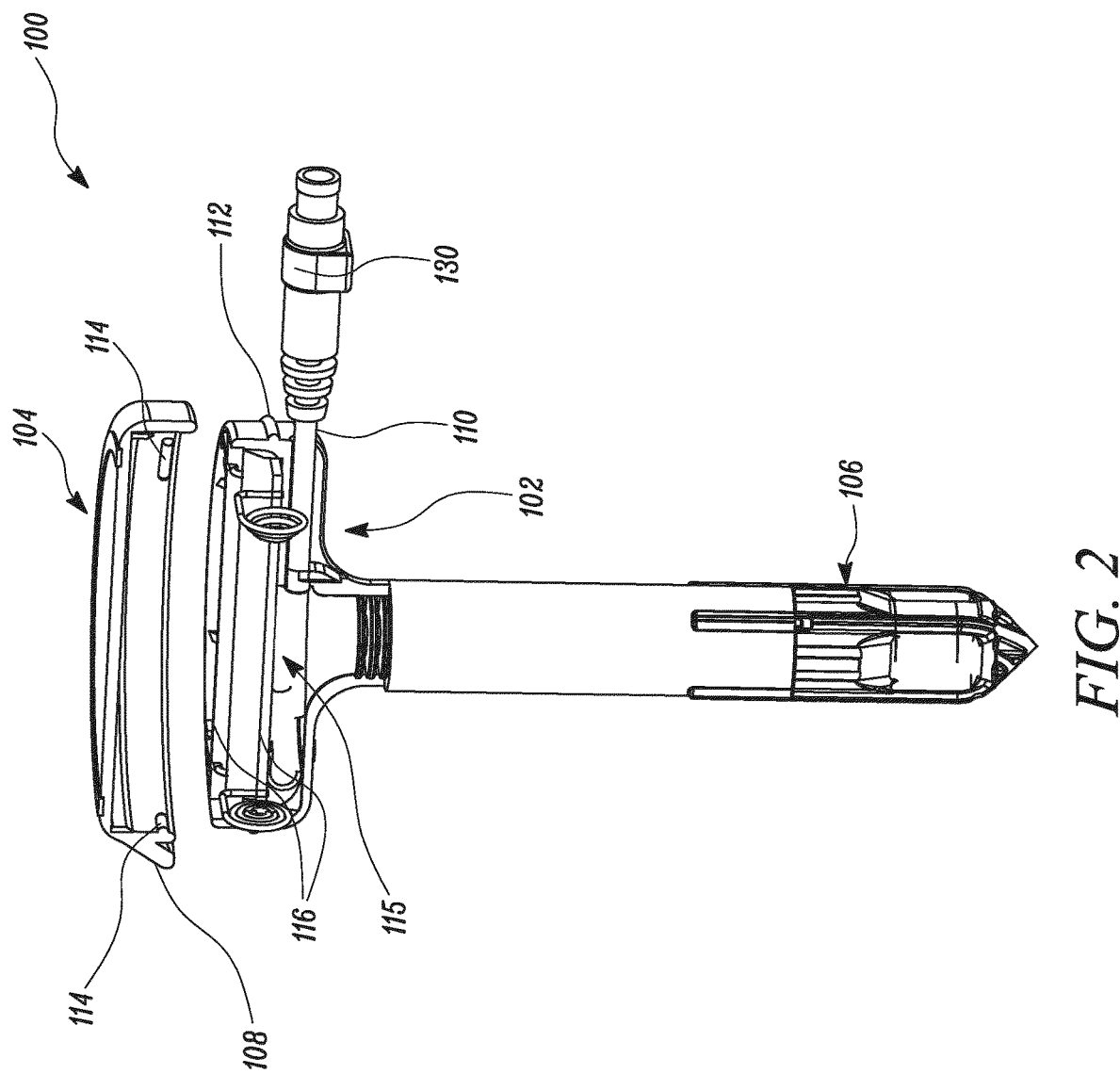
FIG. 2 shows a partial sectional view of the transmitter device with a housing and a cover disassembled therefrom, in accordance with an embodiment of the present invention.

FIG. 2 illustrates a partial view of the transmitter device 100 with the housing 102 and the cover 104 disassembled therefrom. The transmitter device 100 includes a battery compartment 115. The battery compartment 115 includes at least one battery. The battery compartment 115 is accessible from above without a need to disassemble or uninstall the transmitter device 100 out of the ground. The housing 102 may also include an antenna (not shown) dependent on the use case and type of transmitter. This may help to communicate the monitored information (of soil and the like) to external devices such as robotic mowers, user devices (say laptop, tab, smart phone). In case of use of an antenna it may be at least partially covered by the cover 104. Presence of the cover 104 may protect the transmitter device 100 from external agents (say dust, moisture) while extending working life of the transmitter device 100.

The cover 104 includes one or more protrusions 114, or recesses in some embodiments of the present disclosure. Further, the housing 102 has one or more complementary protrusions 112, or recesses for the removable coupling between the cover 104 and the housing 102. The one or more protrusions 114 are provided circumferentially integrally on an internal surface of the cover 104. The one or more complementary protrusions 112 are provided at an external surface of the housing 102. This may lead to less effort being required by a common user to remove the cover 104 from the housing 102. In some embodiments, the housing 102 may have one or more recesses and the cover 104 may have one or more complementary protrusions for the removable coupling between the cover 104 and the housing 102.

As illustrated in FIG. 2, the housing 102 includes one or more integral ribs 116. The integral ribs 116 at least partially contact the. cover 104, when the cover 104 is assembled with the housing 102. This may provide additional and integral strength to the transmitter device 100. The one or more integral ribs 116 of the housing 102 may allow the transmitter device 100 to sustain substantial vertical loads, such as loads involved during movement of ride-on mowers and the like over the transmitter device 100. The one or more integral ribs 116 may further transfer force flow from the cover 104 directly into the housing 102.

In some embodiments, as illustrated in FIG. 2, the transmitter device 100 includes the housing 102. The transmitter device 100 has the at least one battery housed within the housing 102. The transmitter device 100 has the cover 104 which at least partially covers the at least one battery. The transmitter device 100 further includes the sensor 106 electrically coupled with the at least one battery. The transmitter device 100 is installed in a ground surface. The transmitter device 100 is such that the cover 104 is removably coupled with the housing 102 by a snap-fit connection such that the cover 104 is vertically accessible for removal while the transmitter device 100 remains installed. The cover 104 includes one or more recesses or protrusions 114 and the housing 102 has the one or more complementary protrusions 112 or recesses for the removable coupling between the cover 104 and the housing 102. And the cover 104 includes the tab 108 or a slot which allows disassembly of the cover 104 from the housing 102. The housing 102 includes the one or more integral ribs 116 extending towards the cover 104.

In some embodiments, the housing 102 is divided into a battery housing and an antenna housing. Separation of the battery housing and the antenna housing may be due to ergonomic consideration, ease of maintenance and low interference between working (say signals) from the antenna, radio and electronic devices of the transmitter device 100 among others. In some embodiments, the battery may be a rechargeable battery, particularly which may be timely charged by use of solar radiation and the like during outdoor applications.

Figure 3:
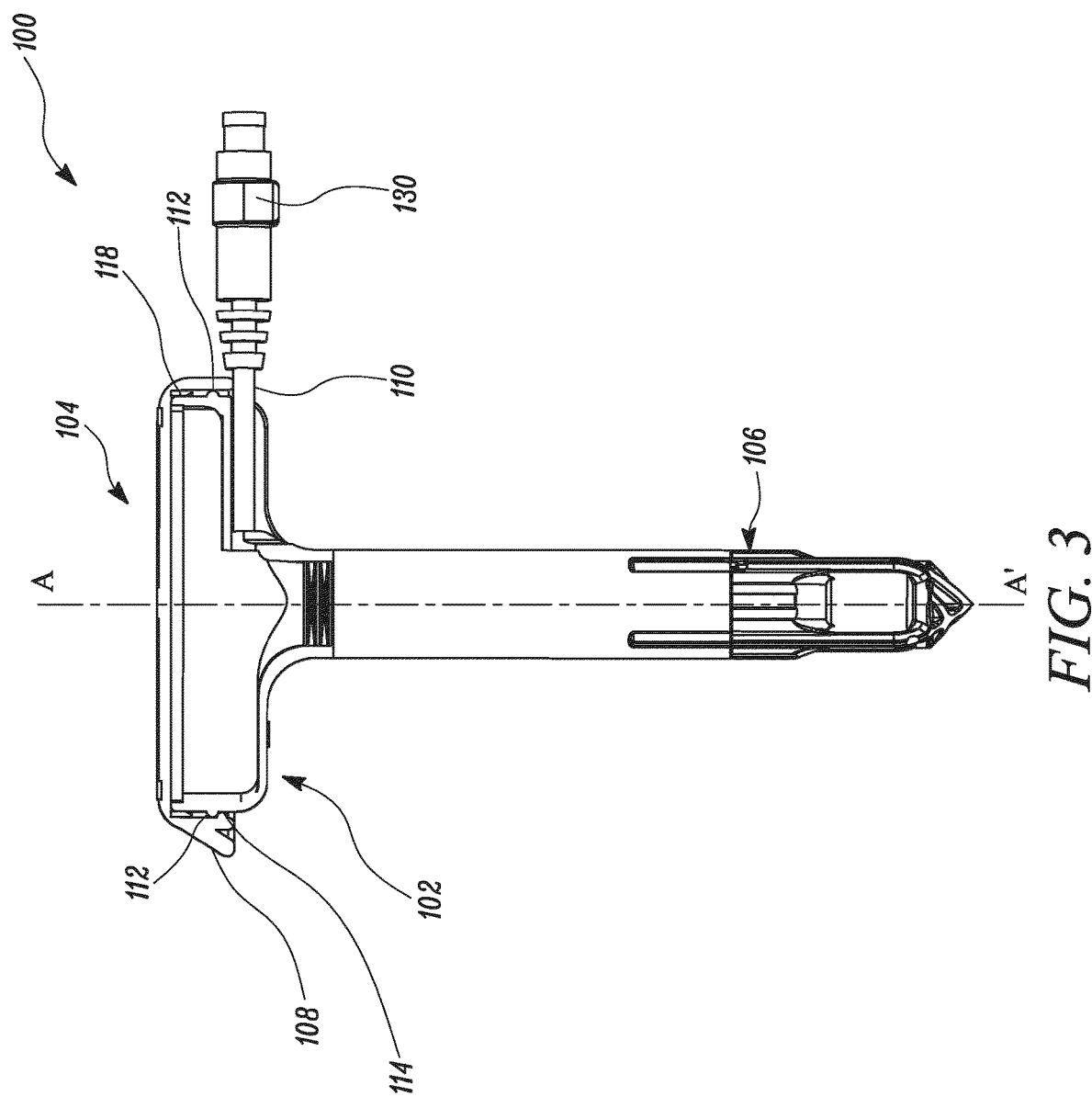
FIG. 3 shows a partial side-sectional view of the transmitter device, in accordance with an embodiment of the present invention.

FIG. 3 illustrates the cover 104 assembled with the transmitter device 100. The cover 104 is removably coupled with the housing 102 by a snap-fit connection. The housing 102 includes the one or more integral ribs 116 extending towards the cover 104. The one or more integral ribs 116 transfer force flow from the cover 104 directly into the housing 102. In some embodiments, one or more integral ribs 116 may play a role to check any inadvertent loosening or disassembly of the cover 104 from the housing 102. This inadvertent loosening or disassembly of the cover 104 may be avoided since the integral ribs 116 allow more balanced, equitable transfer of the force flow from the cover 104 directly into the housing 102. In some embodiments, the cover 104 may be coupled to the housing 102 of the transmitter device 100 by gluing, threading, and the like. The one or more complementary protrusions 112 of the housing 102 and one or more protrusions 114 on the cover 104 may lead to a water-tight sealing therebetween. In this embodiment, no battery may be provided and the transmitter device 100 may be a cord-based device for powering and/or data communications purposes.

The cover 104 may provide sealing effect on assembly with the housing 102. During implementation, the cover 104 may be sealed by the "diving bell principle", i.e. by effect of the enclosed air bubble under the cover 104. This may allow the transmitter device 100 to be completely covered with water for a longer period of time without allowing water to penetrate.

Figure 4:
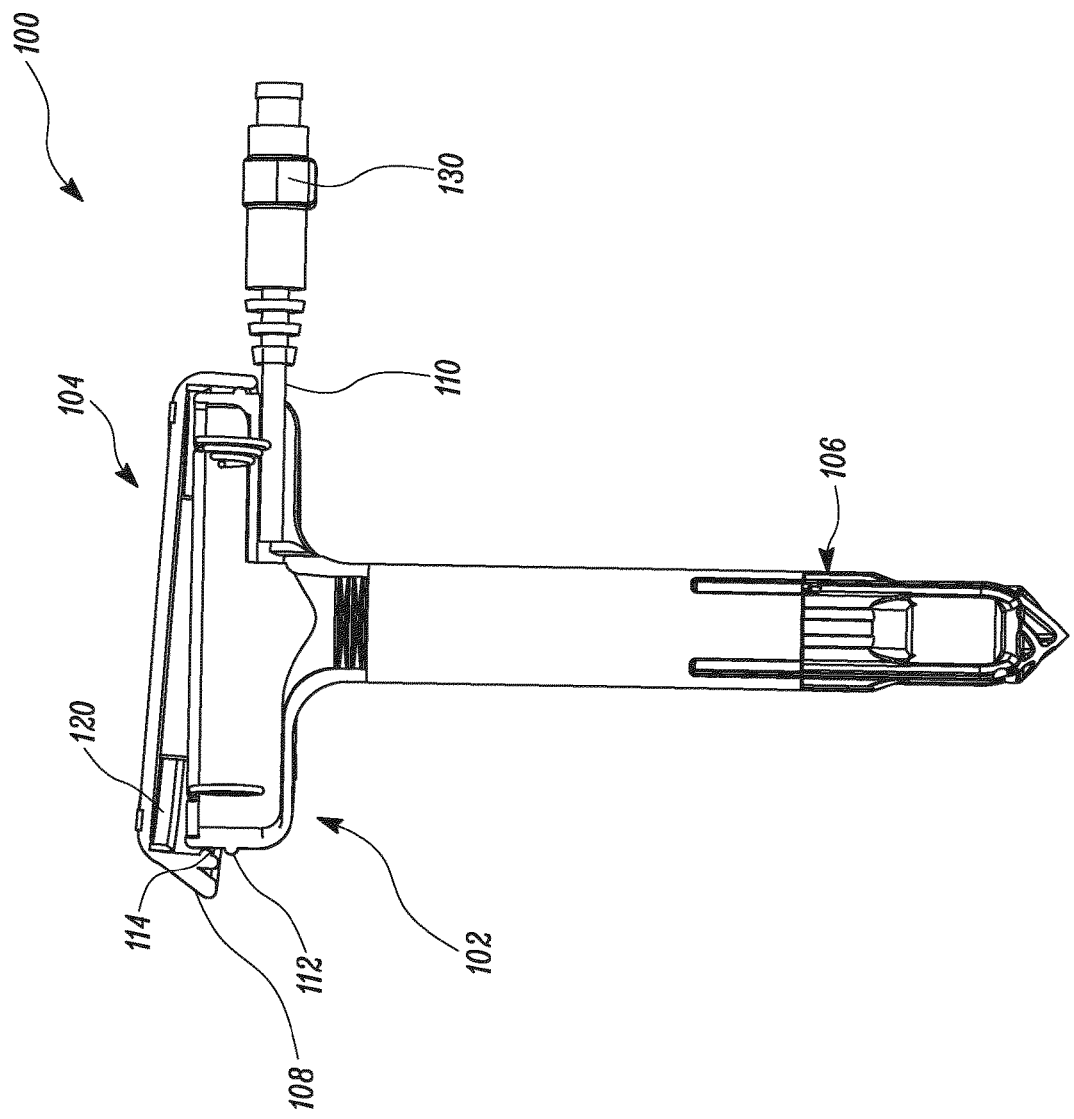
FIG. 4 shows a partial side-sectional view of the transmitter device during disassembly of the cover, in accordance with another embodiment of the present invention.

FIG. 4 illustrates disassembly of the cover 104 from the transmitter device 100. The cover 104 may be opened easily by lifting the tab 108 vertically up along an axis A-A'. The cover 104 is disassembled by a pulling action to detach the cover 104 from the housing 102. This may prevent need of additional accessories and/or tools to detach the cover 104 from the housing 102.

The cover 104 may be pulled sideways, or along an angle to the axis A-A' in some embodiments. The cover 104 has a lateral tab/slot 120. The lateral tab/slot 120 may allow ease of opening or engaging with the cover 104 while also leading to a safer and user-friendly operation. The lateral tab/slot 120 may provide free space to engage fingers of a user or any tool such as a thin rod or a pin to disengage the cover 104 from the housing 102.

The one or more complementary protrusions 112 of the housing 102, the one or more protrusions 114 of the cover 104 may also provide sealing effect. The cover 104 and the housing 102 include one or more seals 118 therebetween Moreover, the one or more seals 118 may be present to provide desired sealing and resistance to water entry within the housing 102. In some embodiments, the seal 118 may be one or more of a radial 2K lip seal, O-ring and the like. The seal 118 may be provided around the one or more complementary protrusions 112 and the one or more protrusions 114 of the housing 102 and the cover 104 respectively.

FIG. 5A illustrates the transmitter device 100, in another embodiment of the present disclosure. As illustrated the housing 102 may be provided with one or more indents 122. The one or more indents 122 provide spaces or areas between the housing 102 and the cover 104 for engagement such as to allow assembly or disassembly of the cover 104. The cover 104 may be pulled or forced upwards, such as by action from the user, through applying an upwards force to the cover at the area where the housing 102 has the one or more indents 122. The one or more indents 122 may be designed and placed on the housing 102 such that fingers of the user may be easily and safely inserted in the one or more indents 122 to open the cover 104. In some embodiments, tools such as a rod or a pin may also be used to disengage the cover 104 in case of some demanding or other circumstances.

FIG. 5B illustrates a view from bottom of the transmitter device 100. The present figure allows to appreciate the placement and role of the one or more indents 122 which are provided on the housing 102. The one or more indents 122 may be present at diametrically opposite ends of the housing 102. The present figure illustrates four number of the one or more indents 122. However, actual implementation of the present disclosure allows any number, position, type, placement, dimension of the indents in accordance with the implementation requirements of the present disclosure.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Transmitter Device
102 Housing
104 Cover
106 Sensor
108 Tab
110 Cable
112 Protrusions
114 Protrusions
115 Battery Compartment
116 Ribs
118 Seal
120 Lateral Tab/Slot
122 Indents
130 Socket
A-A' Axis

The invention claimed is:

1. A transmitter device comprising:
a housing;
a battery housed within the housing;
a cover which at least partially covers the battery; and
a sensor electrically coupled with the battery;
the transmitter device being installed in a ground surface;
wherein the cover is removably coupled with the housing by a snap-fit connection such that the cover is vertically accessible for removal while the transmitter device remains installed,
wherein the cover includes one or more recesses or protrusions and the housing has one or more complementary protrusions or recesses for the removable coupling between the cover and the housing, and the cover includes a tab or a slot which allows disassembly of the cover from the housing, and
wherein the housing includes one or more integral ribs extending towards the cover, and wherein the transmitter device is a soil sensor.

2. The transmitter device of claim 1, wherein the one or more complementary protrusions or recesses are provided circumferentially integrally on an internal surface of the cover and on an external surface of the housing.

3. The transmitter device of claim 1, wherein the one or more complementary protrusions or recesses on the cover and the housing lead to a water-tight sealing therebetween.

4. The transmitter device of claim 1, wherein the cover is disassembled by a pulling action to detach the cover from the housing.

5. The transmitter device of claim 1, wherein the cover and the housing include one or more seals therebetween.

6. The transmitter device of claim 1, wherein the housing includes the one or more integral ribs which at least partially contact the cover, when the cover is assembled with the housing.

7. The transmitter device of claim 1, wherein the housing includes an antenna housed therein.

8. The transmitter device of claim 7, wherein the antenna is at least partially top covered by the cover.

9. The transmitter device of claim 1, wherein transmitter device is configured to measure at least one parameter associated with surrounding environment of the sensor.

10. The transmitter device of claim 1, wherein the transmitter device is electronically arranged to act as a transceiver device.

* * * * *